June 16, 1931.  J. W. LEGG  1,810,021

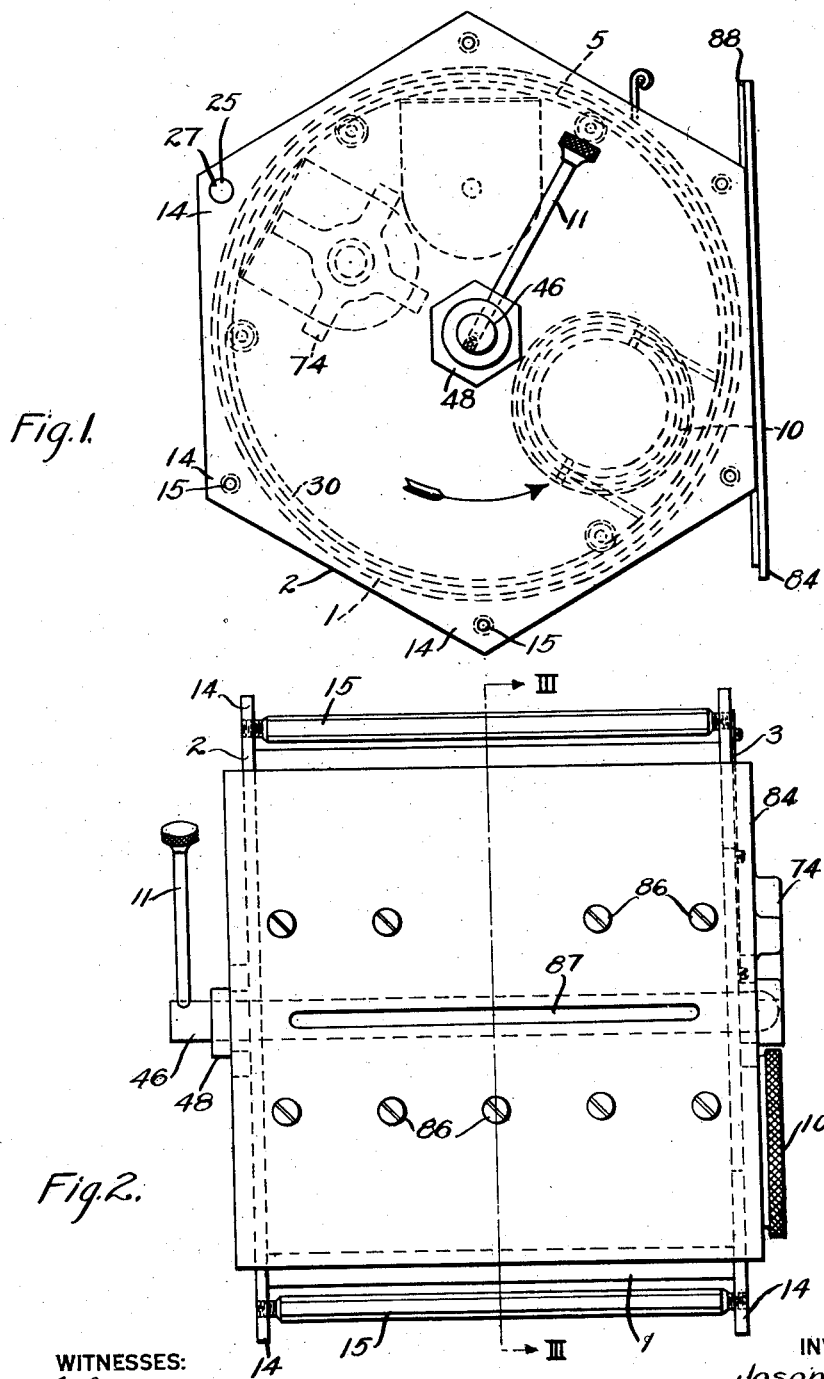

OSCILLOGRAPH FILM HOLDER

Filed Jan. 5, 1923  2 Sheets-Sheet 2

WITNESSES:

INVENTOR
Joseph W. Legg
BY
ATTORNEY

Patented June 16, 1931

1,810,021

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

OSCILLOGRAPH FILM HOLDER

Application filed January 5, 1923. Serial No. 610,953.

My invention relates to recording devices and particularly to film holders for oscillographs.

One object of my invention is to provide a device of the above-indicated character that shall be simple and compact in construction and effective in operation and that shall greatly facilitate the operations of loading and unloading the same.

Another object of my invention is to provide a film holder that shall permit a relatively wide beam of light to be so abruptly focused upon the film as to materially increase the optical efficiency of the device.

Another object of my invention is to provide a novel observation window structure for an oscillograph film holder.

A further object of my invention is to provide a film holder, employing standard film cartridge, by which a selection of lengths of film may be positioned for exposure.

With such objects in view, as well as other advantages which may be incident to the utilization of the improvement, the invention consists in the parts and combinations thereof hereinafter set forth and claimed, with the understanding that the several necessary elements constituting the same may be varied in proportion and arrangement without departing from the nature and scope of the invention.

Figure 3:
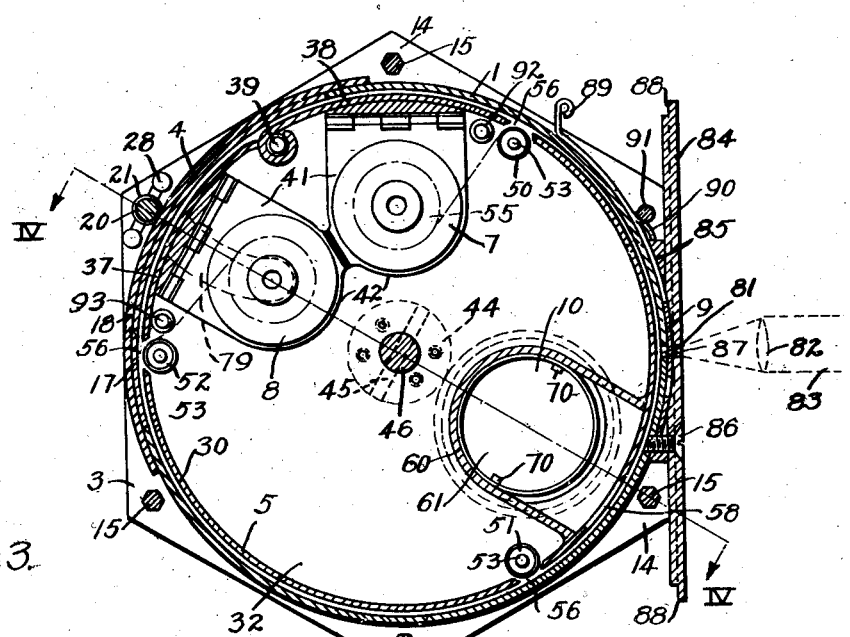
Figure 4:
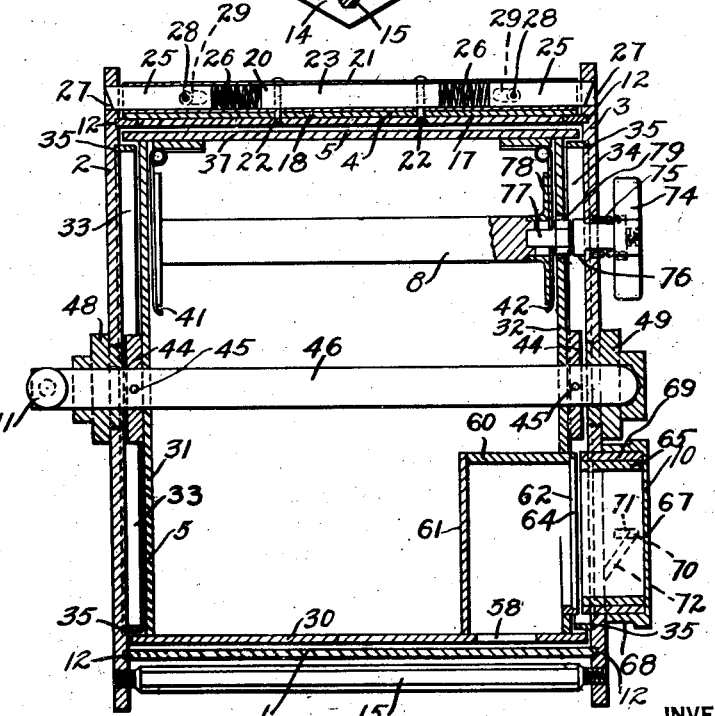

Figure 1 of the accompanying drawings is an end elevational view of the device embodying my invention, Fig. 2 is a side elevational view of the device shown in Fig. 1, Fig. 3 is a transverse sectional view taken along the line III—III of Fig. 2, and Fig. 4 is a longitudinal sectional view taken along the line IV—IV of Fig. 3.

The device comprises, in general, an outer casing having a preferably cylindrical side portion 1 and end plates or members 2 and 3, a lid or cover device 4 for an opening in the casing, a drum member 5 rotatably mounted in the casing, supply and take-up rollers 7 and 8, respectively, mounted in the drum 5, a shutter device 9, an observation window device 10 and an operating member 11.

The portion 1, preferably constructed of relatively thin sheet material, is fitted, at its ends, into grooves 12 in the inner surfaces of the end members 2 and 3. The latter, also of sheet material but slightly thicker than the portion 1, are preferably hexagonal in form to provide apertured portions 14 projecting sufficiently beyond the perimeter of the portion 1 to receive the ends of cross rods or bars 15 which hold the casing parts together.

The lid or cover device 4 comprises a curved rectangular plate or member 17 constituting a section of the cylindrical portion 1 that fits into a rectangular opening in the latter and a plate 18 of similar shape but of greater length and width to overlap the adjacent edges of the plate 17 and the portion 1. The plates 17 and 18 may be separate members secured together or consist of one integral unit.

Extending across the center of the lid 4, in the place of one of the rods 15, is a snap fastening device 20 for securing the lid in position. The fastening device 20 comprises a tubular member 21 preferably secured to the plates 17 and 18 by rivets 22 that extend through the member 21 and through a spacing block or bar 23 in the member 21. Locking dogs or pawls 25 are slidably mounted in the tube 21 and are biased outwardly by springs 26, extending between the spacing bar 23 and the dogs 25, to enter apertures 27 in the end members 2 and 3. Operating handle members 28 are attached to the dogs 25 through slots 29 in the tube 21 to permit the dogs to be withdrawn from the openings 27.

The plates 17 and 18 are constructed of resilient material and normally have a slightly shorter radius of curvature than the portion 1 so that, when they are pressed into operative position, the edges of the plate 17 tightly engage the edges of the portion 1. When thus pressed into position, the dogs 25 snap into the openings 27 in the end members 2 and 3 and back pressure, caused by flexure of the resilient plates 17 and 18, holds the parts securely in position.

The drum member 5, preferably constructed of relatively thin sheet material, comprises a cylindrical portion 30 mounted in the cylindrical casing portion 1 coaxially therewith and discoidal sheet material end members 31 and 32. The cylindrical portion 30 extends longitudinally beyond the end members 31 and 32 in overlapping relation to oppositely disposed annular flanges 33 and 34 that are mounted in grooves 35 in the casing end members 2 and 3, respectively. Arcuate sections 37 and 38 of the cylindrical portion 30 are pivotally mounted or hinged on a rod or shaft 39 extending between the drum end members 31 and 32. The sections 37 and 38 support spring clip holders or supporting members 41 and 42 for the reception of the supply and take-up rollers 7 and 8, respectively.

The drum end members 31 and 32 are provided with thickening or bearing washers 44 through which pins 45 extend for mounting the drum 5 on an operating shaft 46. The latter is supported in bearing members 48 and 49 supported in the casing end members 2 and 3, respectively. The shaft 46 extends through the bearing 48 to receive the operating arm 11 at its outer end. The bearing 49 is a thrust bearing which is provided to hold all of the drum parts in proper space relation to the casing parts when the arm 11 is so rotated as to exert a slight longitudinal thrust on the shaft 46.

Idler rollers 50, 51 and 52, having points on the perimeters thereof substantially flush with the outer perimeter of the drum 5, are mounted on rods or shafts 53 that are supported at the ends thereof in the drum end members 31 and 32.

A photographic film or record chart 55 is adapted to extend from the supply roller 7 to the take-up roller 8, in one instance, over the outer surface of the drum 5 between the rollers 50 and 52 and, in another instance, between the rollers 50 and 51 to thus permit a selection of the length of film which it is desired to expose. Slots 56 in the drum surface permit the film to be extended in the above described manner. In either instance, an opening 58 in the drum portion 30 lies under the film.

In a standard camera film cartridge, the film is wound simultaneously with a strip of paper upon which are marked the numbers of film exposures. Similarly, the chart 55 may be constructed and marked in inches or in any desired manner so as to bring the markings opposite the opening 58. To this end, the film and paper are placed on the outer surface of the drum with the paper next to the drum. A light-proof box or compartment structure, comprising a side wall member 60 and an end member 61, is built around the opening 58 in the drum 5 and is provided with an opening 62 in the end member 32 of the drum. The opening 62 is surrounded by an annular flange or seat portion 64 for the reception, in one position of the drum relative to the casing, of a longitudinally slidable sleeve 65 constituting a portion of the observation window device 10.

The window device 10 further comprises an outer cap member having an end wall 67 and a cylindrical side wall 68 that telescopically fits over a tubular member 69 secured in an opening in the casing end member 3. Relatively short diametrically opposed pins 70 are secured to the sleeve 65 and extend outwardly therefrom through relatively short longitudinal slots 71 in the stationary tube 69 and through diagonal slots 72 in the cylindrical side wall 68 of the outer cap.

When the cap is turned, the edges of the diagonal slots 72 force the pins 70 inwardly to move the sleeve 65 into position against the annular flange 64. This movement brings the inner ends of the slots 72 opposite the pins 70 and permits the cap to be removed. Thus, a view through the openings 62 and 58 may be obtained without admitting light to the interior of the casing and to the film. Conversely, when the cap of the device 10 is replaced and turned, the sleeve 65 will be withdrawn from the flange 64 to permit free rotation of the drum 5.

A key member 74 is longitudinally movably and rotatably mounted in the casing end member 3 in such position that, when the flange 64 is in operative position opposite the sleeve 65, the axis of the take-up roller 8 is opposite the key 74. The latter is held in an outer position by a spring 75 against which the key 74 may be pressed to force the inner or clutch end 76 of the key against a co-operating clutch member 77 fitted into one end of the take-up roller 8. When so pressed, the key 74 may be turned to advance the film 55 from the supply roller 7 to the take-up roller 8. The clutch member 77 is provided with a clutch head portion 78 for interfitting relation with the inner clutch end 76 of the key 74 and extends through an arcuate slot 79 in the drum end member 32 to permit the take-up roller 8 and its associated supporting drum section 37 to be pivotally moved about the shaft 39 to a position outside the drum 5.

The diameter of the cylindrical drum portion 30 is such that, with the paper and film layers thereon, it will just clear the inner surface of the cylindrical casing portion 1 to pass the film as closely as possible to a slot 81 in the latter. The slot 81 is also, by reason of the thinness of the cylindrical casing portion 1, rendered as short as possible, in the direction of a focusing lens 82, in order that a relatively wide beam of light 83 may be abruptly focused to a point on the film opposite the slot 81. This arrangement permits a very great concentration of light upon the film and consequently requires a lamp of low intrinsic brilliancy and economizes the construction in various ways.

A relatively thin face or supporting plate member 84 is securely positioned, as by spacing members 85 and screws 86, on the casing member 1 and is provided with a slot 87 which registers with the slot 81. The plate 84 is provided with rabbeted edges 88 by which the device, as a whole, is mounted for co-operation with an oscillograph, as shown in my prior Patent No. 1,672,894, granted June 12, 1928. The shutter member 9 is constructed of relatively thin sheet material of arcuate form to slide over the outer surface of the casing, and between the casing and the plate 84, to and from position between the slots 81 and 87. An operating handle portion 89 is provided for actuating the shutter 9. A resilient member 90 is mounted on the shutter 9 and co-operating with a pin 91 to hold the shutter in open and closed position.

In loading the device, the cover 4 is removed and the drum moved, if necessary, to permit the pivoted drum section 38 to be turned about the pin 39. This movement places the supporting clips 41 and 42 on said section in accessible position outside the drum 5 for the reception of the supply roller 7. The film and paper are started over the roller 50 and the drum turned counter-clockwise, as viewed in Fig. 3. After a slight movement, the drum section 38 is then pressed inwardly, about the pin 39, to be secured in operative position by a fastening device 92, similar to the device 20, and, by continued counter-clockwise movement, the film is wrapped about the drum until the roller 51 or 52 comes opposite the opening in the drum over which the cover 4 fits.

If a short length of film is desired on the drum, the leading end of the film or opaque paper is threaded through the slot 56 adjacent to the roller 51 and the drum further rotated until the receiving position of the take-up roller 8 comes opposite the opening in the drum. The leading end of the film or paper may then be drawn across the interior of the drum, from the idler roller 51 to the take-up roller 8, for starting on the empty take-up roller or spool which is inserted similarly to the manner in which the supply roller is inserted.

If a longer length of film is desired for exposure on the drum surface, the film will be wound over the drum from the supply roller 7 to the idler roller 52 and thence to the take-up roller 8 as above described. The section 37, upon which the take-up roller 8 is mounted, is also adapted to be secured in operative position by a snap fastening device 93 similar to the devices 20 and 92. In operation, after having been loaded, as above described, the device is placed in co-operative relation to an oscillograph, with the plate 84 fitting a portion of the oscillograph, as above described. This operation brings the slots 81 and 87 into the relation with the lens 82 shown in Fig. 3, the lens being in the oscillograph.

Also, when so placed, a rotating member of the oscillograph (not shown) is adapted to engage the operating member 11.

When ready for an exposure, the handle portion 89 is raised to open the shutter and the operating member 11 is rotated to rotate the drum and film past the slots 81 and 87, after which the handle portion 89 is lowered to close the shutter.

By my invention a daylight-loading film holder is obtained which is very compact in construction and easy to manipulate and that is also light-tight and effective in operation.

While I have shown and described a particular form of my invention, changes may be effected therein without departing from the spirit and scope of my invention as set forth in the appended claims.

I claim as my invention:

1. A graphic-recording device comprising a record-chart supporting drum rotatable relative to a record-receiving position, record-chart supply and take-up rollers mounted in the drum and means for extending the chart from the supply to the take-up roller over one of a selection of arcs on the perimeter of the drum.

2. A graphic-recording device comprising a record-chart supporting drum rotatable relative to a record-receiving position and having a plurality of slots in the side wall thereof, and record-chart supply and take-up rollers mounted in the drum, said rollers being disposed to permit the chart to be extended therebetween over a selective portion of the outer surface of the drum and through one of said slots.

3. A graphic-recording device comprising a light-proof casing, a hollow record-chart supporting drum rotatably mounted therein, a portion of said chart being inside said drum said chart having a sensitized surface and having a protected surface next to the outer surface of the drum, a light-proof compartment structure in the drum surrounding an opening in the latter and having an opening at one end of the drum, and means on the casing permitting a view through both said openings and including means for preventing the admission of light between the drum and the casing around said second opening.

4. A graphic-recording device comprising a light-proof casing having an opening therein, a hollow record-chart supporting drum rotatably mounted therein, a light-proof compartment structure in the drum surrounding an opening in the latter and having an opening at one end of the drum, a movable cap or cover member for the opening in the casing and a sleeve member actuated by movement of said cap to close the opening in said compartment with respect to the interior of the casing.

5. A graphic-recording device comprising a hollow rotatable drum, record-chart supply and take-up rollers disposed therein, said record-chart being adapted to extend from the supply to the take-up roller over an outer surface of the drum, and supporting means for one of said rollers attached to the drum and movable between positions inside and outside the same.

6. A graphic-recording device comprising a hollow rotatable drum, record-chart supply and take-up rollers disposed therein, said record-chart being adapted to extend from the supply to the take-up roller over an outer surface of the drum, and supporting means for said rollers pivotally mounted in the drum for movement between positions inside and outside the same.

7. A graphic-recording device comprising a hollow rotatable drum, record-chart supply and take-up rollers disposed therein, said record-chart being adapted to extend from the supply to the take-up roller over an outer surface of the drum, and supporting means for said rollers coaxially pivotally mounted in the drum to permit the supporting means and the rollers to be moved between positions inside and outside the drum.

8. A graphic-recording device comprising a hollow rotatable drum having a portion of its cylindrical wall outwardly movable, record-chart supply and take-up rollers disposed in the drum, said record-chart being adapted to extend from the supply roller to the take-up roller over an outer surface of the drum, and supporting means for one of said rollers mounted on said outwardly movable portion to permit the roller to be moved out of the drum.

9. A drum adapted to receive a record-sheet on its outer surface, the wall structure of said drum comprising a movable section forming the sole support for a sheet-receiving reel.

10. A drum adapted to receive a record-sheet on its outer surface, the wall structure of said drum comprising a swinging section on which a sheet-receiving reel is supported.

11. A drum adapted to receive a record-sheet on its outer surface, the wall structure of said drum comprising a plurality of swinging sections individually supporting a sheet-receiving reel.

12. The combination with a drum adapted to receive a record-sheet on its outer surface, the wall structure of said drum comprising a swinging section on which a sheet-receiving reel is supported, of a casing for said drum, the wall structure of said casing comprising a movable member permitting access to said swinging section.

13. A recording device comprising a light-proof casing, a hollow record-chart supporting drum including a cylindrical portion rotatably mounted therein, a portion of said chart being stored inside said drum, said chart having a sensitized surface and having a protected surface next to the outer surface of the drum, and a light-proof compartment structure in the drum surrounding an opening in said cylindrical portion and having an opening at one end of the drum, said casing including means which permits a view through both said openings.

In testimony whereof, I have hereunto subscribed my name this 18th day of December, 1922.

JOSEPH W. LEGG.